ELECTRICAL COMPONENT

Filed Feb. 12, 1968

INVENTORS
THOMAS R. BEAVER
JOHN D. VAN BENTHUYSEN
BY John J. Gaydos
ATTORNEY 3,518,604
ELECTRICAL COMPONENT Thomas R. Beaver and John D. Van Benthuysen, Elkhart, Ind., assignors to CTS Corporation, Elkhart, Ind., a corporation of Indiana Filed Feb. 12, 1968, Ser. No. 704,843
Int. Cl. H01c 9/02
U.S. Cl. 338—164 12 Claims

ABSTRACT OF THE DISCLOSURE

Barrel portion of a control operating means is rotatably supported in an aperture formed in a wall of a component housing. Flared portion of barrel extends around periphery of the aperture to provide sliding bearing surface, thrust bearing, and dust seal. Body portion of operating means limits the degree of insertion of barrel portion in the aperture. Base abutting surfaces formed in the housing, flanges integral with the housing, and standoffs formed on a wall of the housing cooperate to precisely locate the base relative to the housing. The standoffs on the housing and standoffs on the base operate to space the component from a mounting board. Terminations anchored in the base may include snap-in mounting means for facilitating mounting of the component on a circuit board. Cementitious material may be used to improve the seal between the base and the housing of the control. Reference is made to the claims for a legal description of the invention.

Figure 1:
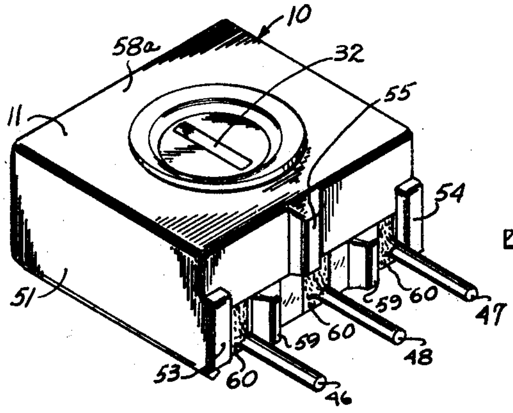

The present invention relates to electrical components and, more particularly, to electrical components wherein a supporting member rotatably supports a movable control operating means in spaced relationship to a base member.

In many applications of electrical components, it is extremely important that the components be provided with means for preventing dust or other foreign matter from entering the component. Often the component is made variable so that the impedance of the component may be rather precisely and accurately adjusted. It is desirable, if not necessary, that the control operating means used to accomplish such adjustment be capable of maintaining the dust excluding integrity of the component, be easily and positively engageable manually or by a tool, and be capable of maintaining a precise setting of the component after an adjustment has been made.

Heretofore, many components have incorporated a resilient sealing member, such as a rubber O-ring, compressed between the control operating means and housing as a means for sealing the component against dust and for providing adequate rotational torque, i.e., adequate frictional resistance to changes in the setting of the component. In actual practice, however, the use of such a compressed resilient member often has not produced satisfactory results because of the tendency of the compressed member to wind-up during adjustment of the component and, after a precise adjustment has been attained, the tendency of the compressed member to unwind or "springback" and alter the adjustment of the component. In addition, components using compressed resilient members have often been less than satisfactory because the compressed members have either lost their resiliency or otherwise become uncompressed with the result that the rotational torque characteristic of the component has been changed and the dust excluding integrity of the component has been compromised. In many of the components employing compressed resilient members it has also been necessary to permit the control operating means to have two degrees of freedom of movement. For example, the control operating means has been free to rotate in order to adjust the component and has been free to move in an axial direction to compress the resilient member. This freedom to move in an axial direction has been found to cause some difficulty in precisely adjusting a component because the control operating means has sometimes moved axially in the housing when being disengaged by an adjusting tool. This movement after attainment of a rather precise setting of the component can have the undesirable effect of altering such setting.

Accordingly, it would be desirable to provide an improved electrical component wherein a movable control operating means is rotatably supported by the component housing to prevent dust from entering the housing, wherein the control operating means is easily and positively engageable for adjustment thereof, wherein the movable control operating means inherently tends to maintain settings of the component after precise adjustments thereof, and wherein the control operating means is positively restrained from moving axially within the component. It will be understood, of course, that electrical components having the aforementioned and following desirable features should be adapted for automated assembly techniques and should be at least as economical to manufacture as the components used heretofore.

It also would be desirable to provide an improved electrical component wherein the control housing is provided with base abutting surfaces for spacing the base of the component a predetermined distance from the control operating means and wherein the housing is provided with one or more flanges swaged around the base to hold the base against the base abutting surfaces so as to prevent ingress of dust into the housing around the base.

Many electrical components are frequently provided with terminations adapted to be plugged into sockets on circuit boards. Accordingly it also would be desirable to provide an electrical component with terminations having snap-in mounting means that facilitate mounting of the component on a circuit board. Yet another desirable feature would be to provide means on the housing and/or base for positively spacing the component from a circuit board to facilitate flushing and cleaning between the component and circuit board. Such spacing also would accomplish the desirable result of encouraging convection currents between the board and the component for dissipating heat generated during operation of the component.

Accordingly, an object of the present invention is to provide a new and improved electrical component having the various desirable features set forth above. Another object of the present invention is to provide an electrical component particularly adapted for automated assembly techniques wherein the component has a reduced number of parts thereby to permit increased economies in the manufacture of such component. Still another object of the present invention is to provide a new and improved electrical component wherein a movable control operating means prevents dust from entering the component, maintains a predetermined rotational torque during the life of the component, and is capable of being moved to effect a precise adjustment of the component while exhibiting an inherent tendency to maintain such adjustment. A further object of the present invention is to provide an easily and readily engageable movable control operating means which, when assembled with a component housing, is rotatable relative to the housing with a predetermined rotational torque and which is restrained from moving in an axial direction relative to the component. A still further object of the present invention is to provide an improved electrical component wherein means precisely space the base of the component from the control operating means and means hold the base in assembled relation to the component in order to prevent the ingress of dust into the component around the base. A more specific object of the invention is to provide an improved electrical component having snap-in mounting means and means for positively spacing the component from a circuit board with which the component is to be ultimately used.

These objects are accomplished in accordance with one form of the present invention by providing an aperture in one wall of the housing of a variable resistance control and assembling a movable control operating means with such housing by inserting a barrel portion of the control operating means through the aperture. In order to secure the operating means to the housing and form a seal therewith, a portion of the operating means flares outwardly around the periphery of the aperture and forms a sealing bearing for coaction with a bearing surface of the housing while preventing withdrawal of the barrel from the aperture. A body portion of the operating means, integral with the barrel portion, limits the degree of insertion of the barrel portion in the aperture. Predetermined spacing of the base from the control operating means is attained by forming a base abutting surface or shoulder internally of the housing. A contractor, constrained to rotate with the control operating means is wedged between the operating means and the base, the latter two elements being held in fixed predetermined spacial relationship by the housing as aforementioned. The body portion of the control operating means can optionally be disposed inside or outside the housing. The flared portion of the control operating means forms a dust seal with the housing, maintains adequate frictional resistance to rotation of the operating means, provides a good bearing surface while acting as a thrust bearing, and further provides a guide for the insertion of an adjusting tool when the body portion of the operating means is disposed internally of the housing. In order to space the variable resistance control from a board on which the control is ao be mounted, standoffs are formed integral with the base and the housing and, in a preferred embodiment, the standoffs formed on the housing provide additional means for positioning the base relative to the housing. Terminals anchored in the base are connected to resistance means and collector means supported on the base. To facilitate mounting of the control on a circuit board, the terminals may be formed to provide snap-in mounting means.

The subject matter which we regard as our invention is set forth in the appended claims. The invention itself, however, together with further objects and advantages thereof may be better understood by referring to the following descriptions taken in connection with the accompanying greatly enlarged drawings.

Figure 2:
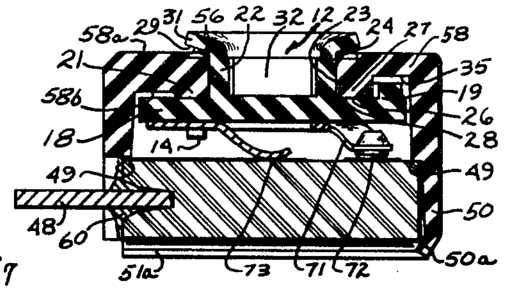
Figures 3, 4, 5, 6:
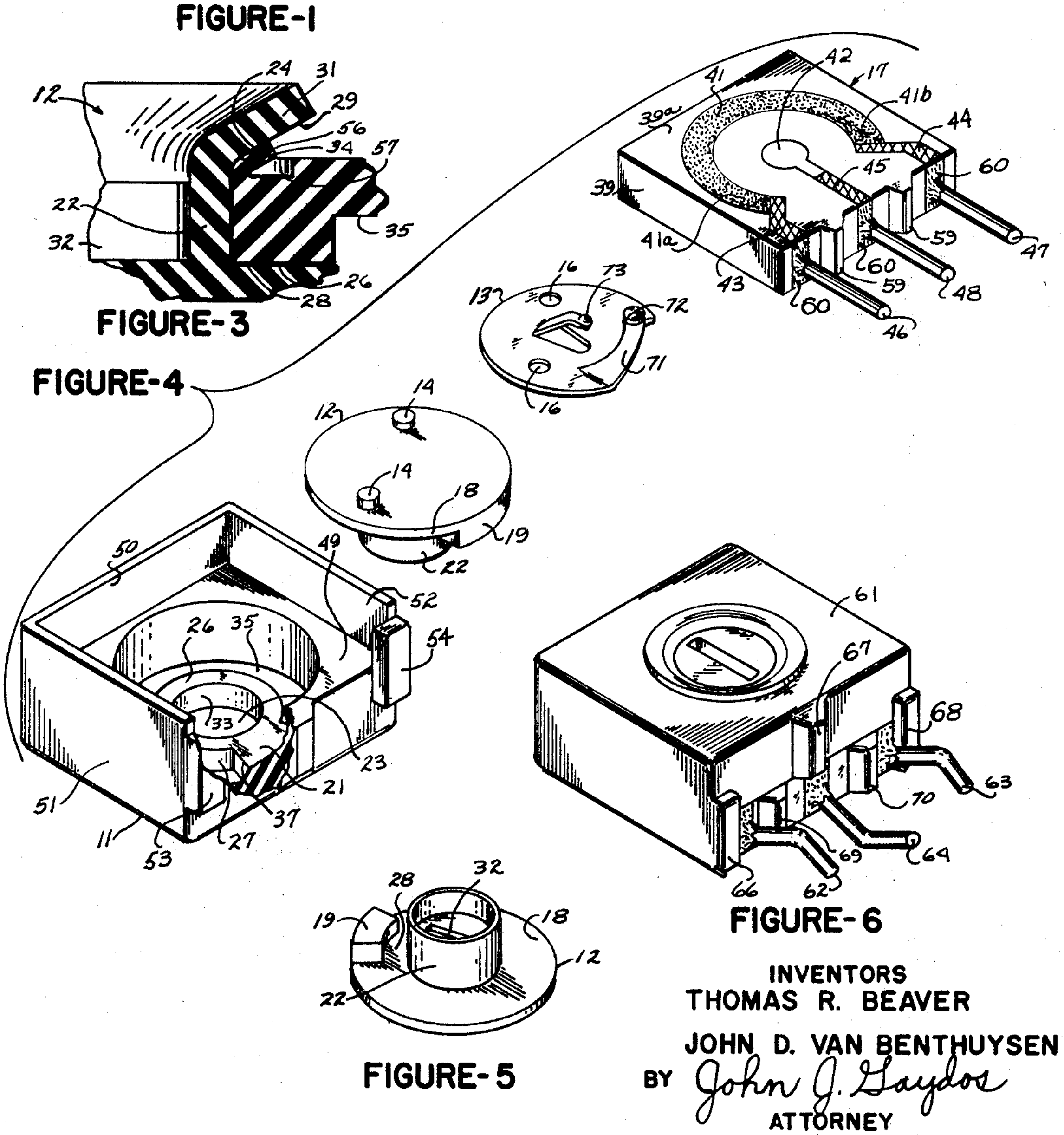

FIG. 1 is an isometric view of a miniature variable resistance control embodying our invention; FIG. 2 is a sectional view of the variable resistance control of FIG. 1; FIG. 3 is an enlarged view of a portion of FIG. 2; FIG. 4 is an exploded view of the variable resistance control of FIG. 1, with parts broken away, and the base rotated 180° to show the resistance path; FIG. 5 is an isometrica view of movable control operating means used in the control of FIG. 1; and FIG. 6 is an isometric view of a miniature variable resistance control having snap-in terminal means and embodying our invention.

Referring now more particularly to the drawings, a variable resistance control embodying one form of the invention is generally identified by the reference numeral 10. As best shown in FIGS. 2 and 4 the control 10 comprises a dust excluding housing 11, a rotatably supported control operating means in the form of a driver 12, a movable contactor 13 constrained to rotate with the driver 12 by the interaction of interlock means such as the bosses 14 on the driver and apertures 16 in the contactor, and a base assembly 17. With reference to FIGS. 2 through 5, it will be seen that the driver 12 comprises a body portion 18 carrying a stop element 19 engageable with a stationary stop 21 formed in the housing, and an integral cylindrical portion or barrel 22 extending through the aperture 23 in the housing. As best shown in FIG. 2, a distal portion of the barrel is flared outwardly over the external edge of the aperture 23 to form a flared bearing 24 disposed against a surface of the housing and to form a dust excluding seal around the periphery of the aperture 23. By holding the driver 12 firmly against one side of the housing, i.e., the end 26 of the skirt 27 (see FIGS. 3 and 2) while the bearing 24 is being formed against an opposite side of the housing, the driver is tightly assembled with the housing 11 and any tendency for axial movement of the barrel 22 in the aperture 23 is substantially eliminated by the action of the pair of opposed bearings 24, 28 against opposed surfaces of the housing.

Although the barrel 22 is flared at the distal portion thereof it will be expressly understood that it is only necessary that opposed bearing surfaces integral with the driver coact with corresponding opposed bearing surfaces carried by the housing. Thus, the skirt 23 or wall of the aperture may have a continuous circular groove formed therein to provide a pair of stationary substantially opposed bearing surfaces carried by the housing and the barrel may have a flared portion, in the form of a bearing ring, coacting with the bearing in the housing. It will be appreciated that when the stationary bearing is in the form of a groove between the inner and outer surfaces of the apertured wall, the flared bearing ring on the barrel may be formed during molding of the driver and then snapped into place in the stationary bearing. Alternatively, assembly, of the driver and housing may be accomplished by holding the barrel in position in the aperture and heat swaging or otherwise deforming a peripheral portion of the barrel to form a flared bearing coacting with the stationary bearing formed in the housing.

Now having reference once again to the embodiment of FIGS. 2 and 3, it will be appreciated that the flared portion of the barrel 12 is characterized by several desirable operational characteristics. More specifically, the outer surface 29 of the flared portion 31 forms a dust excluding seal with the housing, provides an annular bearing 24 for rotation of the driver 12 relative to the housing 11, creates frictional resistance to rotation of the driver 12 by reason of the friction between bearing 24 and the housing, and provides a self-centering guideway for a not shown control adjusting tool when such tool is inserted in the tool receiving slot 32. The integrity of the seal, resistance to axial movement of the barrel, and frictional resistance to rotation in the illustrated embodiment are attainable by reason of various structural interrelationships between the driver 12 and the housing 11. For example, the outer diameter of the barrel 22 is preferably selected relative to the inner diameter of the surface 33 of the skirt 27 to permit comparatively free rotation between the driver and housing while substantially preventing movement of the driver radially with respect to the aperture. Adequate frictional resistance to rotation is accomplished by establishing, during assembly, a predetermined pressure of engagement between the bearing 24 and a bearing surface 34 on the housing. Since the pressure of engagement may vary, as a function of, among other things, the angle of inclination of the flared surface 29 relative to the axis of rotation of the driver 12, the actual interface area between the bearing surface 34 and bearing 24, and the materials used in making the driver and housing, the optimum presure of engagement is best determined empirically after specific materials and geometrical configurations have been selected for the driver and housing. By selecting a desirable pressure of engagement between the bearing surface 34 and bearing 24, and by swaging the flared portion 31 around the periphery of the aperture 23, a desirable dust excluding seal is attained. It will also of course be appreciated that the apertured wall of the housing 11 is tightly sandwiched between the opposed bearings 24, 28 on the driver to substantially eliminate axial movement of the driver 12 in the aperture 23. Since it is not necessary to provide a resiliently deformable sealing member, i.e. a rubber O-ring, compressed between the driver 12 and housing 11, the problems associated with windup and spring back of such a member are eliminated and the driver 12 is readily and accurately adjustable in the aperture 23. The skirt 27, as shown in FIG. 4, has an inner surface 33 defining the aperture 23 and a track 35 is formed around the skirt. The stop element 19 carried by the driver is movable in the track 35 during adjustment of the control. The limits of travel of the driver 12 are defined by the ends 37 of the stationary stop 21 formed integrally with the housing 11 in the track 35.

The base 39 is formed of any suitable material but in the illustrated embodiment is formed of alumina, a high heat resistant ceramic material. Screened on the base 39 is an arcuate resistant path 41 of cermet material, a conductive center collector 42, and solderable conductors 43, 44, 45 extending between the ends **41*a*, 41*b* of the resistance elements and the terminal pins 46, 47 and between the center collector 42 and the terminal pin 48. When assembling the base assembly 17 and contactor 13 to the housing 11, the contactor 13 is positioned with the apertures 16 therein drivingly engaged by the bosses 14 on the driver 12 and the contactor 13 compressed between the body portion 18 of the driver and the base 39 as best shown in FIG. 2. The base assembly 17 is positioned in the housing 11 so that the upper surface 39*a* thereof engages the base abutting surface 49 of the housing. The back wall 50 and sidewalls 51, 52 of the housing cooperate with the standoffs 53, 54 for positively locating the base relative to the housing 11. Flanged distal portions of the walls retain the base against the abutting surface 49. More particularly, the walls of the housing are swaged over the base to form base-retaining flanges 50*a*–52*a* as best illustrated in FIG. 2. Although it is not a critical aspect of our invention, we have found that the addition of a cementitious material along the shoulders formed by the base abutting surface 49** of the housing prior to assembly of the base with the housing further improves the dust excluding characteristics of components embodying our invention. Cementitious materials suitable for this purpose include well known silicone adhesives which remain in a soft or semicured state.

Now having reference once more to FIG. 2, it will be seen that a lip is provided around the edge of the aperture 23 in the housing 11 to improve the dust excluding characteristics of the control. Although an adequate dust seal can be attained without providing a lip, the preferred embodiment of the invention utilizes, as illustrated, a lip in the form of a flap 56. A relieved area 57 may underlie the flap 56 so that after formation of the bearing 28 and deformation of the flap 56 around the periphery of the aperture 23, the flap may lie above the relieved area as shown in the drawing, or actually be depressed into the relieved area, depending on what pressure of engagement between the flap and bearing 24 has been selected as optimum. Of course, it will be appreciated that when the relative position of the driver and housing as viewed for example in FIG. 2 is reversed, the flap may be formed on either the side **58*a* of the wall 58 as shown or along the internal surface 58*b* of the wall 58. Although for most applications, the relative disposition of the driver and the housing illustrated in FIG. 2 is preferred, in those applications where a manually adjustable movable control operating means is desired, the body portion 18 of the driver 12 may be located externally of the housing and the barrel 22 is flared around the periphery of the aperture 23 against the internal surface 58*b* of the housing. With this alternative arrangement, the periphery of the body portion 18** may be knurled or otherwise contoured in order to promote facile manual adjustment thereof.

As will be best appreciated from an inspection of FIG. 1, the standoffs 53–55 formed on the housing 11 cooperate with the standoffs 59 formed on the base and space the control from a not shown mounting panel or circuit board. Such spacing is often required in order to insure that flux or solder 60 applied to the terminal pins 46–48 during automatic soldering operations will not contact a major portion of the control. In additon, such spacing will readily permit flushing between the terminal pins after the control 10 is mounted on a circuit board and will also permit the movement of convective air currents between the control and the board. Now having reference to FIG. 6 it will be seen that control 61 illustrated therein is generally simlar to the control of FIG. 1. However, the terminal pins 62–64 have been provided with inwardly and outwardly diverging cam segments to provide snap in mounting means. With this arrangement, the component can be readily and easily snapped into place on a not shown printed circuit board with the standoffs 66–70 spacing the control 61 from the board.

When the control illustrated in FIG. 1 was actually constructed, the base 39 was formed of high alumina having a thickness after firing of about 0.090 of an inch, a width of about 0.390 of an inch, and a depth of about 0.375 of an inch. The terminal pins 46–48 were formed from tin coated, half hard 0.018 of an inch diameter copper wire and the conductive center collector 42 was applied to the base. The resistance path was screened onto the base and consisted of a cermet resistance material. The paddle 71 of contactor 13 was fitted with a carbon contact button 72. The paddle 73 was formed from the body of the contactor 13 as illustrated and the driver and housing were molded from a thermoplastic material. During assembly, the flared bearing 24 was formed by heat swaging as were the flanges **50*a*–52*a* and the contactor was wedged between the driver 12 and base assembly 17 with the paddles 71, 73 resiliently engaging the resistance means 41 and collector 42**, respectively. While we have shown, as an embodiment of our invention, a control having a generally rectangular configuration, it will be expressly understood that generally cylindrical controls with the terminals projecting from the side or the base thereof can, with equal facility embody the present invention.

In view of the foregoing, it will be appreciated that we have provided an improved electrical control having improved control operating means and having improved base and housing structural interrelationships. More specifically, the improved control operating means maintains adequate rotational torque of the control, is not shiftable axially relative to the housing, and exhibts no tendency to inherently change the control setting after adjustments thereto.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What we claim as new and desire to secure by Letters Patent of the United States is:

1. A variable resistance control comprising a dust excluding housing having a plurality of walls, a base closing the housing and forming a wall thereof, an aperture in one of the walls, a driver supported by the housing for rotation relative thereto, resistance means supported within the housing, and a contactor wipingly engaging the resistance means and constrained to rotate with the driver, the driver comprising a body portion and a barrel integral with the body portion, the barrel extending through the aperture with a portion of the barrel securing the driver to the housing, said portion of the barrel including a flared bearing extending outwardly from the periphery of the aperture.

2. The control of claim 1 wherein the housing comprises abutment means for positioning the base relative to the housing, and at least one wall extends across a portion of the base, said at least one wall having a flange swaged over the base to secure the base to the housing.

3. The control of claim 1 wherein a plurality of terminals are supported by the base and project from a surface thereof, said base and housing having a plurality of standoffs formed thereon for spacing the control from a mounting board to be used with the control, at least one of the standoffs formed on the housing providing means for positioning the base relative to the housing.

4. The control of claim 1 wherein a collector is disposed within the housing, the contactor is wedged between the driver and the base, and the contractor is provided with first and second paddles, the first paddle wipingly engaging the collector, and the second paddle wipingly engaging the resistance means.

5. An electrical component comprising a housing having a plurality of walls, a base closing the housing and forming a wall thereof, one of said walls having an aperture therein, a control operating means rotatably supported in the aperture, resistance means supported within the housing, a contactor wipingly engaging the resistance means and constrained to move upon rotation of said control operating means, the control operating means comprising a body portion and a tool receiving portion axially aligned with the aperture, said control operating means further comprising a flared portion extending around the periphery of the aperture to form a bearing support for the control operating means, to form a seal with the housing, and to facilitate insertion of a tool in the tool receiving portion.

6. A variable resistance control comprising a dust excluding housing having a plurality of walls, a base closing the housing and forming a wall thereof, an aperture in one of the walls, a driver supported by the housing for rotation relative thereto, resistance means supported within the housing, and a contactor wipingly engaging the resistance means and constrained to move upon rotation of the driver, the driver extending through the aperture with a portion of the driver securing the driver to the housing and sealing the housing around the periphery of the aperture, a sealing lip integral with said one of the walls extending around the periphery of the aperture, said sealing lip being deformed outwardly from the periphery of the aperture and being engaged by said driver to improve the seal between the housing and the driver.

7. A variable resistance control comprising a dust excluding housing having a plurality of walls, a base closing the housing and forming a wall thereof, an aperture in one of the walls, a driver supported by the housing for movement relative thereto, resistance means supported within the housing, and a contactor wipingly engaging the resistance means and constrained to move upon movement of said driver, the driver extending through the aperture with a portion of the driver securing the driver to the housing and sealing the housing around the periphery of the aperture, said portion including a flared bearing extending around the periphery of the aperture.

8. The control of claim 7 wherein a stop element is carried by the driver and cooperates with a stationary stop projecting from said housing for limiting movement of the driver relative to the housing.

9. A variable resistance control comprising a dust excluding housing having a plurality of walls, a base closing the housing and forming a wall thereof, an aperture in one of the walls, a driver supported by the housing for rotation relative thereto, resistance means supported within the housing, and a contactor wipingly engaging the resistance means and constrained to rotate with the driver, the driver extending through the aperture with a portion of the driver securing the driver to the housing and sealing the housing around the periphery of the aperture, a skirt formed integrally with said one of the walls, an inner surface of the skirt defining the aperture, an annular track formed on a surface of said one of the walls around the skirt, the driver bearing against said skirt, a stop element carried by the driver for traveling in the annular track, and a stationary stop disposed in said track cooperating with the stop element for limiting rotation of the driver relative to the housing.

10. An electrical component comprising a housing having a plurality of walls, a base closing the housing and forming a wall thereof, an aperture in one of the walls, resistance means supported within the housing, a contactor disposed within said housing in wiping engagement with said resistance means, and a driver extending through said aperture, said driver being connected to said contactor for imparting movement to said contactor along said resistance means, a portion of said driver extending outwardly from the periphery of the aperture and forming a bearing engaging a bearing surface of said housing thereby securing the driver to the housing and sealing the housing around the periphery of the aperture.

11. The electrical component of claim 10 wherein a sealing lip extends around the periphery of the aperture and engages said driver to improve the seal between the housing and the driver.

12. The electrical component of claim 11 wherein said sealing lip is deformed outwardly from the periphery of the aperture and maintains pressure of engagement with the portion of the driver extending outwardly from the periphery.

References Cited

UNITED STATES PATENTS

| | | | |
|---|---|---|---|
| 3,237,140 | 2/1966 | Barden et al. | 338—164 |
| 3,387,247 | 6/1968 | Mishler | 338—162 |
| 3,096,499 | 7/1963 | Hudson et al. | 338—174 X |
| 3,197,726 | 7/1965 | Hulbert | 338—164 |
| 3,406,367 | 10/1968 | Maguire | 338—184 |
| 3,099,057 | 7/1963 | Cook | 24—141 |
| 3,215,303 | 11/1965 | Dearle | 174—153 X |

LARAMIE E. ASKIN, Primary Examiner

A. T. GRIMLEY, Assistant Examiner

U.S. Cl. X.R.

338—184, 322